United States Patent [19]

Mott et al.

[11] 4,129,258
[45] Dec. 12, 1978

[54] AUTOMATIC HYDRAULIC SERIES-PARALLEL SHIFT DEVICE FOR IMPLEMENT

[75] Inventors: Richard H. Mott; Clyde L. Pritchard, both of Sioux Falls, S. Dak.

[73] Assignee: Du-Al Manufacturing Company, Sioux Falls, S. Dak.

[21] Appl. No.: 764,444

[22] Filed: Jan. 31, 1977

[51] Int. Cl.² .............................................. A01C 3/06
[52] U.S. Cl. .................................... 239/650; 60/424
[58] Field of Search .............. 239/650, 672, 673, 677; 222/613, 624; 60/421, 424, 425, 431

[56] References Cited

U.S. PATENT DOCUMENTS

| | | | |
|---|---|---|---|
| 3,073,123 | 1/1963 | Hodgson | 60/424 |
| 3,776,431 | 12/1973 | Riley | 239/677 |

FOREIGN PATENT DOCUMENTS 964186  5/1957  Fed. Rep. of Germany ............. 239/65

Primary Examiner—James B. Marbert
Attorney, Agent, or Firm—Hill, Gross, Simpson, Van Santen, Steadman, Chiara & Simpson

[57] ABSTRACT

An apparatus such as a farm implement or other mechanical device subject to varying loads and power requirements has an hydraulic circuit which automatically shifts two or more hydraulic motors from a normal series operation at high speed to a parallel operation at reduced speed but higher torque in response to increased fluid pressure upstream of the motors. In a disclosed embodiment, a valve is connected to block flows from the fluid source to inlet of one motor and from outlets of both motors directly to drain under low pressure conditions but to shift to allow two parallel flows to the two motors upon increase in pressure in the flow from the source. A third motor driving an auxiliary device such as a material feed is by-passed in the parallel-flow condition.

17 Claims, 3 Drawing Figures

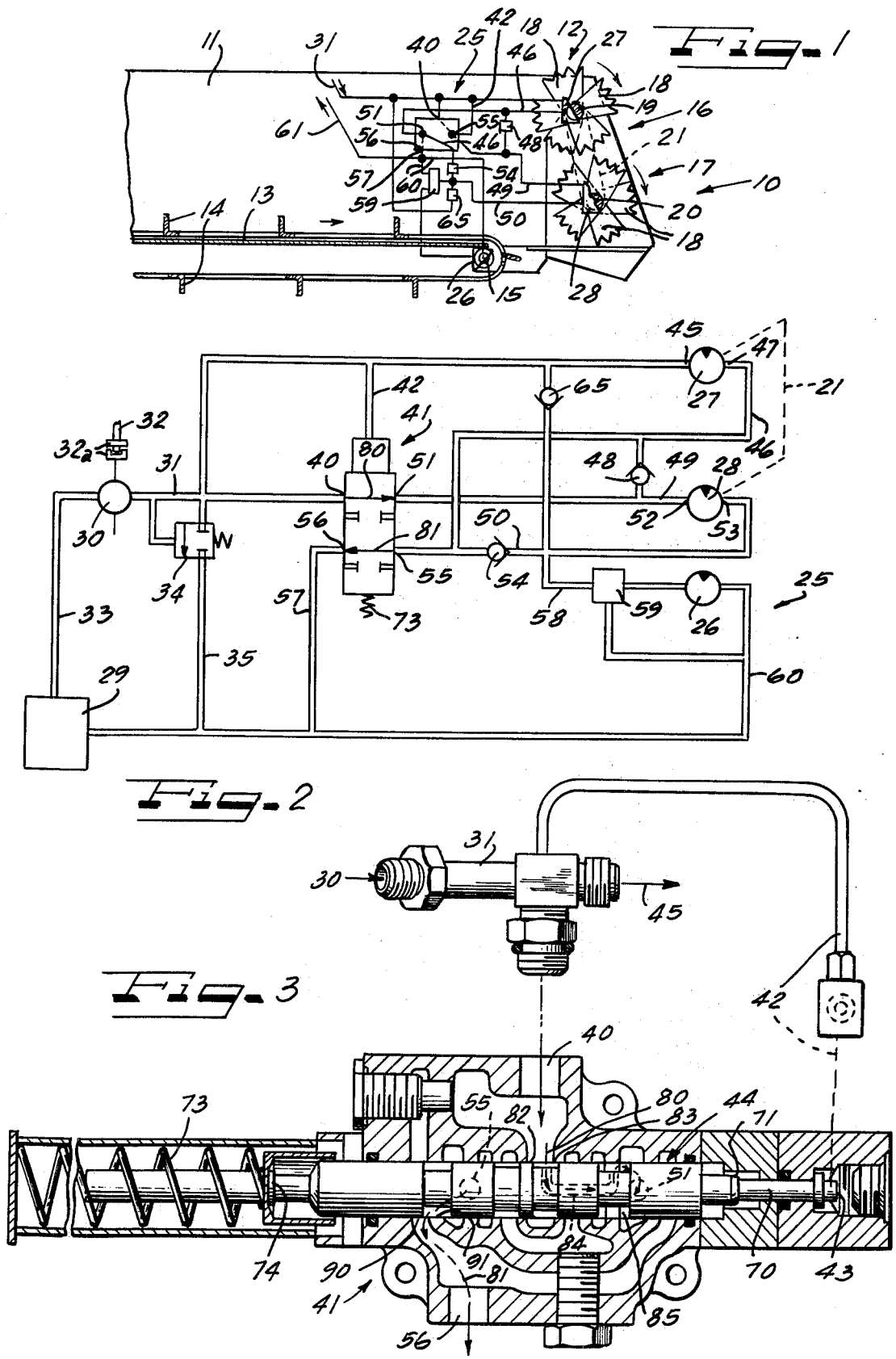

AUTOMATIC HYDRAULIC SERIES-PARALLEL SHIFT DEVICE FOR IMPLEMENT

BACKGROUND OF THE INVENTION

1. Field of the Invention

The present invention relates to farm and to other machinery having a device or devices driven by two or more hydraulic motors and wherein it is desirable to vary stepwise and automatically the power fed to each motor.

2. The Prior Art

In prior art devices known to the applicant such as manure spreaders for farm use, a pair of horizontally-extending beater axles are arranged in the rear of a hopper bed or trailer for shearing and flinging outwardly onto a field a load of solid material such as animal waste. Hydraulic motors driving the axles in the prior art were connected in series, with power controlled by varying the pressure and flow volume of hydraulic fluid fed thereto. Such devices had great difficulty in beginning to rotate under load, especially when the material was tightly compacted against the axles, or when the axles were retained by frozen chunks. In many cases the conventional hydraulic system would be unable to start the beaters rotating until material was cleared from the beaters by hand. In most cases, it was necessary in loading the hopper bed to keep material carefully away from the flinging bars.

SUMMARY OF THE INVENTION

In accordance with the present invention, an hydraulically-operated farm implement or the like comprises a wheeled hopper having a rearward end, a floor, and upper and lower flinger or beater bars each journalled in and extending horizontally across the rearward end of the hopper. A mechanical connection provides for same-speed rotation of the two beaters. First and second hydraulic motors are each arranged for rotatably driving one of the upper and lower flinger bars. An hydraulic circuit assembly located on the implement drives each of the first and second hydraulic motors selectively either in series at high speed or in parallel at lower speed with a higher torque. The hydraulic circuit includes a valve having first through fourth ports and an actuatable internal portion such as a spool for selectively blocking all four ports and alternatively for connecting first and second ports together and third and fourth ports together, depending upon fluid pressure at the first port. A first fluid line communicates the source of pressurized fluid to the first port of the valve and to an inlet of the first motor. A second fluid line communicates the outlet of the first motor through a first check valve to a third fluid line. The third fluid line communicates the second port of the valve to the inlet of the second motor. The second fluid line also communicates the outlet of the first motor to the third port of the valve. A fourth fluid line communicates the outlet of the second motor to drain selectively either through a load such as a motor driving a conveyor in the floor of the implement or through a second check valve to the third port of the valve. A fifth fluid line communicates the fourth port of the valve to drain or tank.

THE DRAWINGS

FIG. 1 is a side section view, partly schematic, through a rear portion of a farm implement employing the present invention;

FIG. 2 is a schematic diagram of the hydraulic circuitry of the present invention in a farm implement embodiment; and FIG. 3 is a side view, partly in section, of the main valve of the present invention and associated fittings.

THE PREFERRED EMBODIMENTS

A farm implement such as a manure spreader is shown at 10 in FIG. 1, including a hopper bed 11 having walls, a floor, a front end (not shown), and a rearward end 12. Above the floor of the hopper 11 runs a conveyor belt or apron 13 having vertically upstanding ridges 14 thereon for carrying solid material within the hopper 11 rearwardly. The apron 13 is driven by a conveyor axle 15 located near the rearward end 12 of the implement 10. A pair of beater or flinger units 16 and 17 are also arranged in the rearward end 12 of the implement 10, one above the other, and extending transversely across the hopper bed 11. Each beater or flinger 16, 17 comprises a plurality of toothed shredding and flinging arms 18 extending radially outwardly from axles 19, 20 journalled in the walls of the hopper 11. The axles 19, 20 are interconnected for joint co-rotation by means such as a chain 21.

An hydraulic circuit 25 comprises valves and conduits is arranged on the rear portion 12 of the hopper 11 of the implement 10 for powering and controlling motors 26, 27 and 28, respectively driving the apron axle 15 and the upper and lower flinger bars 16 and 17. The circuitry 25 is shown schematically in FIG. 2 and as a plumbing diagram in FIG. 1.

A source of pressurized fluid, such as a positive displacement pump 30 driven through a clutch 32a by a shaft 32 as from an engine (not shown) and a first fluid line 31, is used to activate the system 25. The pump 30 is supplied with hydraulic fluid from a tank 29 through a supply line 33. An emergency pressure relief valve 34 returns fluid from the first line 31 to the tank 29 through a flow passage 35 which connects to the drain line 60, upon severe pressure overload.

The first fluid flow line 31 communicates to a first port 40 of a spool valve assembly 41 which is central to the system 25. The flow line 31 also communicates via a capillary tube 42 into one end of the spool valve 41 to bear against a surface 43 of a valve spool or actuating piston 44 therewithin. The first flow line 31 further connects to an inlet side 45 of the first hydraulic motor 27. A second fluid line 46 communicates an outlet side 47 of the motor 27 through a first check valve 48 to a third fluid line 49. The check valve 48 permits flow only in a downward direction in the orientation of FIG. 2, from the second line 46 to the third line 49, and prevents upward flow.

The third fluid line 49 communicates between a second port 51 on the spool valve 41, opposite the first port 40 thereon, and an inlet side 52 of the second motor 28. The second fluid line 46 also communicates the outlet side 47 of the first motor 27 directly to a third port 55 on the spool valve 41. The third port 55 is opposite a fourth port 56 thereon. The fourth fluid line 50 communicates from an outlet side 53 of the second motor 28 through a second check valve 54 to the second fluid line 46, through a third check valve 65 to the first fluid line 31, and directly to a flow divider 59. The second check valve 54 permits flow only to the left in the orientation of FIG. 2, from the fourth line 50 to the second line 46, and prevents flow to the right. The third check valve 65 permits flow only in an upward direction in the orientation of FIG. 2, from the fourth line 50 to the first line 31, and prevents downward flow.

The third check valve 65 provides a free wheeling relief passage to allow the beaters 16 and 17 to coast gradually to stop upon ceasing of the flow of fluid from the pump 30 and first fluid line 31. Were the check valve 65 not to be provided, the beaters 16, 17 would be immediately stopped upon ceasing of the positive-displacement pump 30, with disasterous mechanical stresses on the system.

The flow divider 59 is selectively adjustable from a remote control position as by an electric motor or other convenient means to pass a portion of fluid from the line 50 into the apron motor 26 and then into a drain line 60 to the tank 29. Any unneeded portion of flow from the line 50 is passed directly to drain line 60. The fourth port 56 of the spool valve 41 communicates to a fifth flow line 57 which connects to the drain line 60.

The spool valve 41 is a commercially available four way, three position, closed center directional control valve, such as a "Cross" brand model BA, with the spool mechanically blocked from entering the cross flow position. As shown in FIG. 3, the valve 41 has first, second, third, and fourth ports 40, 51, 55, and 56, respectively. The capillary tube 42 communicates presurized fluid to the end surface of a pilot piston 70 which in turn bears upon an end 71 of the spool 44 within the valve 41. Pressure from the fluid line 31 acting on the end 43 of the piston 70 is counteracted by a coil spring 73 pressing against an opposite end 74 of the spool 44. Internal friction between the spool 44 and the valve 41 provides the means by which the spool 44 shifts upon pressure increase to a first level but does not shift back until a second, lower pressure is attained.

The valve spool 44 has a plurality of lands and recesses which cooperate with a corresponding valve bore and flow channels to form a pair of flow passages 80 and 81 between the first and second ports 40, 51 and the third and fourth ports 55, 56, respectively, when the spool 44 is moved leftwardly in the orientation of FIG. 3. Flow passage 80 is formed by the passing of a land 82 to the left of a portion 83 of the valve bore so that fluid entering the valve 41 at the first port 40 can flow through an internal passageway 84 in the spool 44 to a recess 85 communicating with the second port 51, which connects to the third flow line 49. The second passage 81 is formed between the port 55 and the port 56 by the opening of a space between a land 90 and a valve bore portion 91.

When pressure from the line 31 on the surface 43 of the pilot piston 70 decreases to a point where the bias of its spring 73 is not overcome, the valve spool 44 will be moved to the right in the orientation of FIG. 3, causing the lands 82 and 90 on the valve spool 44 to block all flows of fluids to or from the ports 40, 51, 55 and 56. The normal position of the spool 44 is to the right in FIG. 3, or upwardly in FIG. 2, due to the spring bias.

In operation, the implement 10 is loaded with solid material which is to be distributed about a field by the flinger or beater units 16, 17. The hopper 11 may be filled completely, including the rear portion 12, and the material in implement 10 may be compacted about the beaters 16, 17. When the hopper 11 is full, the implement 10 is connected to a tractor or other source of either power for the pump 30 or pressurized hydraulic fluid for the line 31. Upon driving of the pump 30 through the clutch 32a by the drive shaft 32, the pump pressurizes fluid within the line 31, the capillary 42, and the inlet 45 of the motor 27. Since the capillary 42 was initially unpressurized, the valve spool 44 was initially in its normal right-ward position in FIG. 3 or an upward position in FIG. 2, under the bias of the spring 73. Since the passage 80 is not open, pressurizing the fluid line 31 does not pressurize the third fluid line 49 except to the extent that the motor 27 turns.

Where the material in the hopper 11 is loosely packed and the blades 18 on the flingers 16 and 17 are able to rotate through the material, pressure in the first fluid line 31 will never rise to the degree necessary to overcome the bias of the spring 73 via the surface 43. The spool 44 will remain in its original or neutral position, blocking each of the ports 40, 51, 55 and 56 in the valve 41. Fluid courses through the lines 31 and 46, through the check valve 48, through line 49 to the second motor 28, and through the line 50. Normally, at least a portion of the flow passes through the motor 26. The beaters or flingers 16, 17 are rotated and the apron 13 moves rearwardly along the bottom of the hopper 11 to supply more material to the rear 12 of the implement 10 at a speed depending on the setting of the flow divider 59. Since each motor 27, 28 receives full flow from the pump 30, each will rotate at uniform high speed, but with a pressure drop thereacross up to one half of the pressure in the line 31.

Whenever either the upper or the lower beater 16, 17 is jammed, whether upon start up or by the striking of hard material such as a board during series operation, pressure in the flow line 31 and the capillary 42 will immediately rise. When the pressure rise is sufficiently great, the spool 44 will react to open the flow passages 80 and 81. Immediately, a new, parallel flow route is established, wherein the full hydraulic pressure developed in the pump 30 is applied across each motor 27, 28, respectively through the lines 31, and 46 and through the lines 31, 80, 49, and 50. Since a flow passage from line 50 to tank 29 is open via line 57 through the passage 81 in the valve 44, the apron motor 26 is effectively by-passed and will not operate. Full pressure from the pump 30 is then applied to each of the motors 27 and 28, but the flow is divided between them, reducing their speed by half. Since the chain or other connector 21 keeps the beaters 16, 17 running at the same or proportional speeds, power will not be fed solely to the less-loaded beater. The high-power, low-speed operation has been found effective for digging the beaters 16 and 17 out of even compacted manure in a hopper 11 and to cut through even substantial pieces of wood and other shreddable materials deposited into the hopper 11. The connection 21 insures that jamming of either beater 16, 17 will trigger the valve 41 to go into a parallel mode until the jam is cleared.

Upon decoupling of the drive shaft 32 from the pump 30 at the clutch 32a, pressurization of the flow line 31 will cease. If the beaters 16 and 17 have been rotating at high speed, they will have substantial rotational inertia sufficient to destroy either or both of the motors 27, 28 upon any sudden locking thereof. Therefore, as the axles 19 and 20 continue to rotate, pressure developed in the outlets 47 and 53 is relieved by passage of fluid from the fourth pressure line 50 to the first pressure line 31 through the third check valve 65.

The automatic series-parallel shifting device disclosed herein of course has application to other farm implements besides manure spreaders and, indeed, to other fields such as wheel drive systems for hydraulically-operated land vehicles. In such applications more than two motors 27, 28 may be desirable, such as to drive three or more wheels or axles independently. Two or more series-parallel combinations or orders of shifting may readily be designed in accordance with the principles and structure herein disclosed. Although various modifications and adaptations may be suggested by those versed in the art, it should be understood that we wish to embody within the scope of the patent warranted hereon all such modifications as reasonably and properly come within the scope of our contribution to the art.

We claim as our invention:

1. An hydraulically operated manure spreader comprising:
    a hopper having a rearward end;
    an upper and a lower flinger assembly each journalled in and extending horizontally across said rearward end of the hopper and having transversely-extending arm means for shredding and throwing piled material rearwardly and outwardly of the hopper;
    first and second hydraulic motors each arranged for each rotatably driving one of said upper and lower flinger assemblies and each having a fluid inlet and a fluid outlet;
    a source of pressurized fluid; and
    hydraulic circuit means on said hopper for selectively driving each of said first and second hydraulic motors in series at high speed or in parallel at lower speed and higher torque from said source of pressurized fluid, said hydraulic circuit means comprising
    a valve having first through fourth ports and an actuatable internal means for selectively blocking said ports and for connecting said first and second ports together and said third and fourth ports together depending on fluid pressure at said first port,
    a first fluid line communicating the source of pressurized fluid to said first port of said valve and to said inlet of said first motor,
    a second fluid line communicating the outlet of the first motor through a first check valve to a third fluid line and directly to said third port of said valve;
    said third fluid line communicating said second port of the valve to the inlet of the second motor,
    a fourth fluid line communicating the outlet of said second motor selectively to a load and through a second check valve to said second line and said third port, and
    a fifth fluid line communicating said fourth port of said valve to drain.

2. An hydraulically-operated farm implement as defined in claim 1, wherein said load comprises a third hydraulic motor driving an apron along a lower portion of the hopper.

3. An hydraulically-operated farm implement as defined in claim 2, wherein said load further comprises a flow divider connected between an inlet side of said third motor and said drain for controlling speed of rotation of said third motor.

4. An hydraulic circuit for use in an implement for selectively driving first and second hydraulic motors in series at high speed and in parallel at low speed with increased torque, the circuit comprising:
    a source of flowing, pressurized hydraulic fluid;
    a spool valve receiving fluid from said source and having a slidable valve spool therewithin with an end surface portion;
    a first fluid line communicating from said fluid source to an inlet side of said first motor, to one end portion of said slidable spool of said spool valve, and to a first port of said spool valve;
    a second fluid line communicating from an outlet side of said first motor to a third fluid line through a check valve and to a third port of said spool valve;
    said third fluid line communicating from a second port of said spool valve to said inlet side of said second motor;
    a fourth fluid line communicating from an outlet side of said second motor to drain and to said third port of said spool valve;
    said valve spool forming flow channel means therein selectively connecting said first and second ports together and said third and fourth ports together in a first reciprocable position and blocking each of said ports in a second reciprocable position; and
    a spring means bearing on and biasing said valve spool in opposition to pressure imposed on said one end portion by fluid pressure in said first line,
    whereby said first and second motors operate at high speeds in series when said spool valve is in said second reciprocable position with low pressure in said first line but said motors operate at lower speed in parallel with higher torque when said valve spool is in said first reciprocable position upon increase in pressure in said first line.

5. An hydraulic circuit as defined in claim 4, wherein said fourth line selectively communicates through a load to drain when said valve spool is in said second reciprocable position and through a second check valve to said second line and said third port of said valve to drain when said spool is in its said first reciprocable position.

6. Hydraulic circuit means for operating at least a pair of hydraulic motors selectively in series and in parallel as a function of a load on at least one of said motors, said circuit means comprising:
    first and second hydraulic motors having their power outputs interconnected for same speed rotation;
    a source of pressurized hydraulic fluid;
    first conduit means for directly communicating said source of fluid to drive the first of said hydraulic motors;
    valve means for receiving fluid from said source and selectively passing it to drive the second hydraulic motor in parallel operation with the first motor as a function of increased pressure in said first conduit means;
    second conduit means communicating fluid from said first motor selectively to drain and to drive the second hydraulic motor in lieu of said fluid passed through the valve means; and
    third conduit means directly communicating fluid from said second motor to drain.

7. Hydraulic circuit means as defined in claim 6, wherein said third conduit communicates fluid from said second motor to drain selectively directly through said valve means and through a load comprising a third hydraulic motor, and means also being provided for deactivating said third hydraulic motor during parallel operation.

8. An hydraulically operated manure spreader comprising in combination:
 a hopper in which material is hauled to be discharged and spread from a rearward end;
 upper and lower flinger rotors extending across the rearward end of the hopper for shredding and throwing piled material rearwardly of the hopper;
 first and second hydraulic motors mechanically interconnected for same speed rotation respectively connected to said upper and lower rotors for driving them in rotation;
 means for supplying a pressurized fluid to the motors for driving them; and
 valve means for controlling the flow of pressurized fluid to the motors in a first circuit arrangement wherein the motors are connected in parallel to share the pressurized fluid and operate at a lower speed, and a second circuit arrangement wherein the motors are connected in series to successively receive the pressurized fluid to operate at a higher speed whereby the rotors can be started in said first arrangement for removing material piled thereagainst and changed to the second arrangement for normal operation and emptying the remainder of the hopper.

9. An hydraulically operated manure spreader constructed in accordance with claim 8:
 and including automatic means for operating said valve means to change from said first circuit arrangement to said second circuit arrangement automatically responsive to decrease in back pressure from the motors to a predetermined level and to the second circuit arrangement responsive to increase in back pressure from the motors to a predetermined level.

10. An hydraulically operated manure spreader constructed in accordance with claim 8:
 including an hydraulically driven apron for moving material in the hopper rearwardly toward the rotors; and
 means for deactivating said apron during parallel flow operation of the rotors.

11. An hydraulic drive for an implement comprising in combination:
 a first hydraulic motor in driving connection with a first member on the implement;
 a second hydraulic motor in driving connection with a second member on the implement,
  said members operable at a first lower speed at high torque or a second higher speed;
 linking means for maintaining same-speed rotation of the first and second members when one of the members is loaded differently than the other;
 a pressurized hydraulic fluid supply connected to said motors;
 valve means connected between the fluid supply and the motors; and
 an operator for said valve means selectively changing the valve means between a first and a second position, said valve means in said first position connecting the motors in parallel from the fluid supply and in the second position connecting the motors in series from the fluid supply.

12. An hydraulic drive for an implement constructed in accordance with claim 11:
 including a pressure responsive means connected to the valve operator wherein the valve means is in said first position at high back pressures from the motor and in second position at lower back pressures.

13. The method of driving first and second rotary members such as beaters in a manure spreader which comprises:
 driving each beater individually with a hydraulic fluid operated motor;
 providing a common source of pressurized operating fluid to the motors;
 operating the motors in parallel slow speed, high torque relationship at the beginning of operation;
 providing a mechanical linkage to maintain same-speed rotation of the two beaters when one is loaded differently than the other during the parallel operation;
 and subsequently shifting to higher speed series operation wherein the motors are connected in series to receive the pressurized fluid so that initial resistances to load are overcome at high torque and the mechanism is then shifted to a higher speed operation.

14. A method for driving first and second rotating members, comprising the steps of:
 driving each member with a separate hydraulic fluid operated motor;
 providing a common source of pressurized operating fluid to the motors;
 mechanically linking the two members and fluid operated motors to insure same-speed operation when one of the motors is loaded differently than the other;
 automatically shifting the motors to parallel operation at slow speed and high torque when one of the motors is loaded above a predetermined load; and
 operating the motors in higher speed lower torque series operation when loads on the motors are below the predetermined load.

15. The method of claim 14 wherein pressure at an outlet of the motors is relieved during stopping of the motors.

16. The hydraulic drive of claim 11 wherein a relief valve means is connected to relieve outlet pressure of the first and second motors during stopping of the hydraulic drive to prevent damage to the first and second motors and driven implements.

17. The hydraulic drive of claim 11 wherein the valve means has no more than four ports excluding ports for the operator.

* * * * *